United States Patent
Iwaya

(10) Patent No.: US 8,576,582 B2
(45) Date of Patent: Nov. 5, 2013

(54) DC-DC CONVERTER

(75) Inventor: Kazuki Iwaya, Tokyo (JP)

(73) Assignee: TDK-Lambda Corporation, Tokyo (JP)

( * ) Notice: Subject to any disclaimer, the term of this patent is extended or adjusted under 35 U.S.C. 154(b) by 267 days.

(21) Appl. No.: 13/158,811

(22) Filed: Jun. 13, 2011

(65) Prior Publication Data

US 2011/0310636 A1    Dec. 22, 2011

(30) Foreign Application Priority Data

Jun. 17, 2010   (JP) ................... 2010-138733

(51) Int. Cl.
*H02M 3/335*   (2006.01)

(52) U.S. Cl.
USPC ........................................................... 363/17

(58) Field of Classification Search
USPC ....................... 363/17, 24, 98, 132
See application file for complete search history.

(56) References Cited

U.S. PATENT DOCUMENTS

| | | | | |
|---|---|---|---|---|
| 4,257,087 A | * | 3/1981 | Cuk | 363/16 |
| 7,778,046 B1 | * | 8/2010 | Cuk et al. | 363/16 |
| 2009/0251938 A1 | * | 10/2009 | Hallak | 363/132 |

FOREIGN PATENT DOCUMENTS

| | | |
|---|---|---|
| JP | A-9-168278 | 6/1997 |
| JP | A-11-098835 | 4/1999 |
| JP | A-2003-164151 | 6/2003 |
| JP | A-2005-110384 | 4/2005 |

\* cited by examiner

*Primary Examiner* — Jue Zhang
(74) *Attorney, Agent, or Firm* — Oliff & Berridge, PLC

(57) ABSTRACT

A DC-DC converter includes a current-source power converter that converts direct current into alternating current; a transformer that transforms the voltage of the alternating current output from the current-source power converter; a rectifier that converts the alternating current the voltage of which has been transformed by the transformer, into direct current; and a capacitor that is connected in series with winding of the transformer on the rectifier side, and blocks a direct-current component from being applied to the transformer.

6 Claims, 4 Drawing Sheets

DC-DC CONVERTER

CROSS-REFERENCE TO RELATED APPLICATIONS

This application is based upon and claims the benefit of priority from Japanese Patent Application No. 2010-138733, filed on Jun. 17, 2010, the entire contents of which are incorporated herein by reference.

BACKGROUND OF THE INVENTION

1. Field of the Invention

The present invention relates to a DC-DC converter, and more particularly, to a method of reducing biased magnetization of a transformer used in the DC-DC converter.

2. Description of the Related Art

To prevent biased magnetization of transformers in DC-DC converters, typical DC-DC converters extract a biased magnetization component from current flowing through a transformer, and controls ON/OFF of a switching element, which controls the current flowing through the transformer, such that the biased magnetization component can be cancelled out (Japanese Laid-open Patent Publication No. 9-168278).

However, in the method disclosed in Japanese Laid-open Patent Publication No. 9-168278, there is a problem in that it is necessary to add a number of components, such as a current sensor, a low-pass filter, an adder, a subtractor, and a comparator, to the DC-DC converter in order to control current flowing through the transformer so as to cancel out a biased magnetization component.

SUMMARY OF THE INVENTION

A DC-DC converter according to an aspect of the present invention includes a current-source power converter that converts direct current into alternating current; a transformer that transforms a voltage of the alternating current output from the current-source power converter; a rectifier that converts the alternating current, the voltage of which has been transformed by the transformer, into direct current; and a capacitor that is connected in series with winding of the transformer on the rectifier side, and blocks a direct-current component from being applied to the transformer.

A DC-DC converter according to another aspect of the present invention includes a current-source power converter that converts direct current into alternating current; a transformer that transforms a voltage of the alternating current output from the current-source power converter; a voltage-source power converter that converts the alternating current, the voltage of which has been transformed by the transformer, into direct current; and a capacitor that is connected in series with winding of the transformer on the voltage-source power converter side, and blocks a direct-current component from being applied to the transformer.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
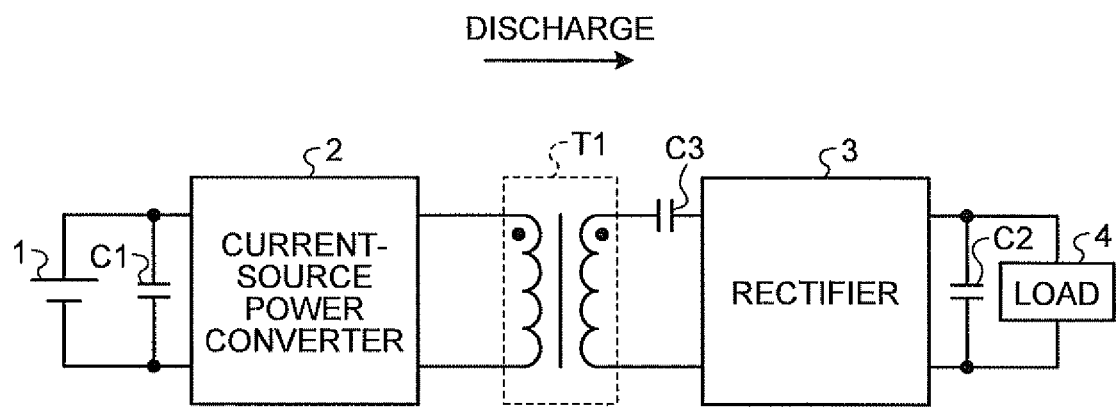
FIG. 1 is a block diagram illustrating a schematic configuration of a DC-DC converter according to a first embodiment of the present invention.

FIG. 1 is a block diagram illustrating a schematic configuration of a DC-DC converter according to a first embodiment of the present invention.

In FIG. 1, the DC-DC converter includes a current-source power converter 2 that converts direct current into alternating current; a transformer T1 that transforms the voltage of the alternating current output from the current-source power converter 2; a rectifier 3 that converts the alternating current, the voltage of which has been transformed by the transformer T1, into direct current; and a capacitor C3 that blocks a direct-current component from being applied to the transformer T1. The current-source power converter 2 controls current that flows into the primary side of the transformer T1 by turning on and off a switching element, thereby enabling power conversion.

A direct-current power supply 1 is connected to the input side of the current-source power converter 2. A smoothing capacitor C1 is connected in parallel with the direct-current power supply 1. The primary winding of the transformer T1 is connected to the output side of the current-source power converter 2.

The secondary winding of the transformer T1 is connected to the input side of the rectifier 3 via the capacitor C3. The capacitor C3 is connected in series with the secondary winding of the transformer T1. A load 4 is connected to the output side of the rectifier 3. A smoothing capacitor C2 is connected in parallel with the load 4. The load 4 may be, for example, an electronic device that operates with direct current; a storage battery; or a direct-current motor. The rectifier 3 may be, for example, a diode bridge.

Direct current supplied from the direct-current power supply 1 is converted into alternating current by the current-source power converter 2 and output to the rectifier 3 through the transformer T1. The alternating current output through the transformer T1 is rectified by the rectifier 3, smoothed by the smoothing capacitor C2, and supplied to the load 4.

When a direct-current component is superimposed on the alternating current to be output to the rectifier 3, electrical charges corresponding to the direct-current component are accumulated in the capacitor C3, and the direct-current component is cancelled out by a voltage that is generated in the capacitor C3 by accumulation of the electrical charges. Therefore, the direct-current component is blocked from being applied to the transformer T1.

Consequently, it becomes possible to reduce biased magnetization of the transformer T1 without having to detect current that flows through the transformer T1. Therefore, it is not necessary to additionally provide a number of components, such as a current sensor, a low-pass filter, an adder, a subtractor, and a comparator, that perform PWM (pulse-width modulation) control based on extraction results of biased magnetization components. As a result, it is possible to suppress an increase in the number of components.

Figure 2:
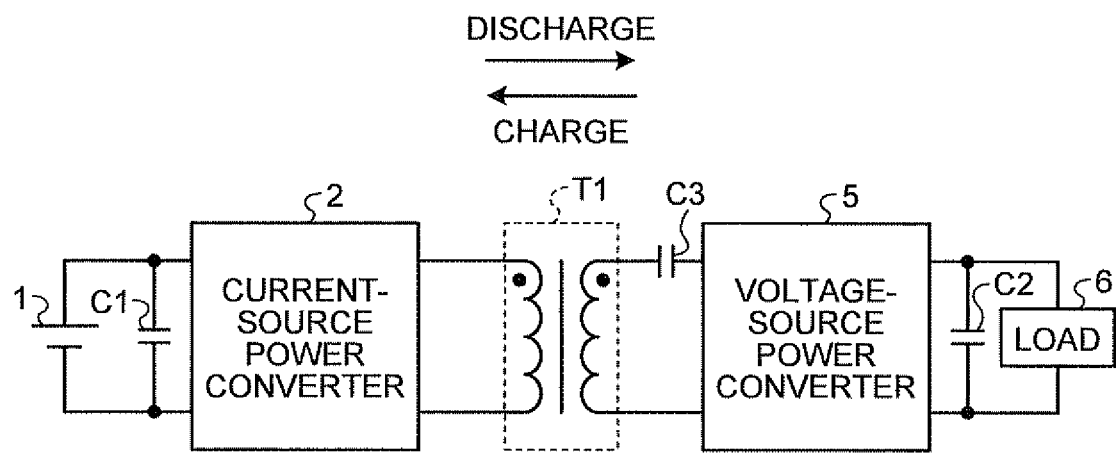
FIG. 2 is a block diagram illustrating a schematic configuration of a DC-DC converter according to a second embodiment of the present invention.

FIG. 2 is a block diagram illustrating a schematic configuration of a DC-DC converter according to a second embodiment of the present invention.

In FIG. 2, the DC-DC converter includes a voltage-source power converter 5 instead of the rectifier 3 of FIG. 1. The voltage-source power converter 5 controls a voltage to be applied to the secondary side of the transformer T1 by turning on and off a switching element, thereby enabling power conversion.

The DC-DC converter includes a load 6 instead of the load 4 of FIG. 1. The load 6 may be, for example, an electronic device that operates with direct current; a storage battery; or a direct-current motor. For further example, the load 6 may be a solar battery cell or an electrical generator. The direct-current power supply 1 may be a storage battery or a storage capacitor.

When the direct-current power supply 1 discharges, direct current supplied from the direct-current power supply 1 is converted into alternating current by the current-source power converter 2 and output to the voltage-source power converter 5 through the transformer T1. The alternating current output through the transformer T1 is rectified by the voltage-source power converter 5, smoothed by the smoothing capacitor C2, and supplied to the load 6. The voltage-source power converter 5 may be configured to perform synchronous rectification when the direct-current power supply 1 discharges.

On the other hand, when the direct-current power supply 1 charges, direct current supplied from the load 6 is converted into alternating current by the voltage-source power converter 5 and output to the current-source power converter 2 through the transformer T1. The alternating current output through the transformer T1 is rectified by the current-source power converter 2, smoothed by the smoothing capacitor C1, and supplied to the direct-current power supply 1. The current-source power converter 2 may be configured to perform synchronous rectification when the direct-current power supply 1 charges.

When the direct-current power supply 1 discharges, and if a direct-current component is superimposed on the alternating current to be output to the voltage-source power converter 5, electrical charges corresponding to the direct-current component are accumulated in the capacitor C3, and the direct-current component is cancelled out by a voltage that is generated in the capacitor C3 by accumulation of the electrical charges. Therefore, the direct-current component is blocked from being applied to the transformer T1.

When the direct-current power supply 1 charges, and if a direct-current component is superimposed on the alternating current output from the voltage-source power converter 5, electrical charges corresponding to the direct-current component are accumulated in the capacitor C3, and the direct-current component is cancelled out by a voltage that is generated in the capacitor C3 by accumulation of the electrical charges. Therefore, the direct-current component is blocked from being applied to the transformer T1.

Consequently, even when the electrical power of the DC-DC converter is controlled to flow bi-directionally, it is possible to reduce biased magnetization of the transformer T1 by connecting the capacitor C3 in series with the transformer T1 on only the voltage-source power converter 5 side. Therefore, it is not necessary to provide a biased-magnetization prevention circuit on the current-source power converter 2 side. As a result, it is possible to suppress an increase in the number of components.

Figure 3:
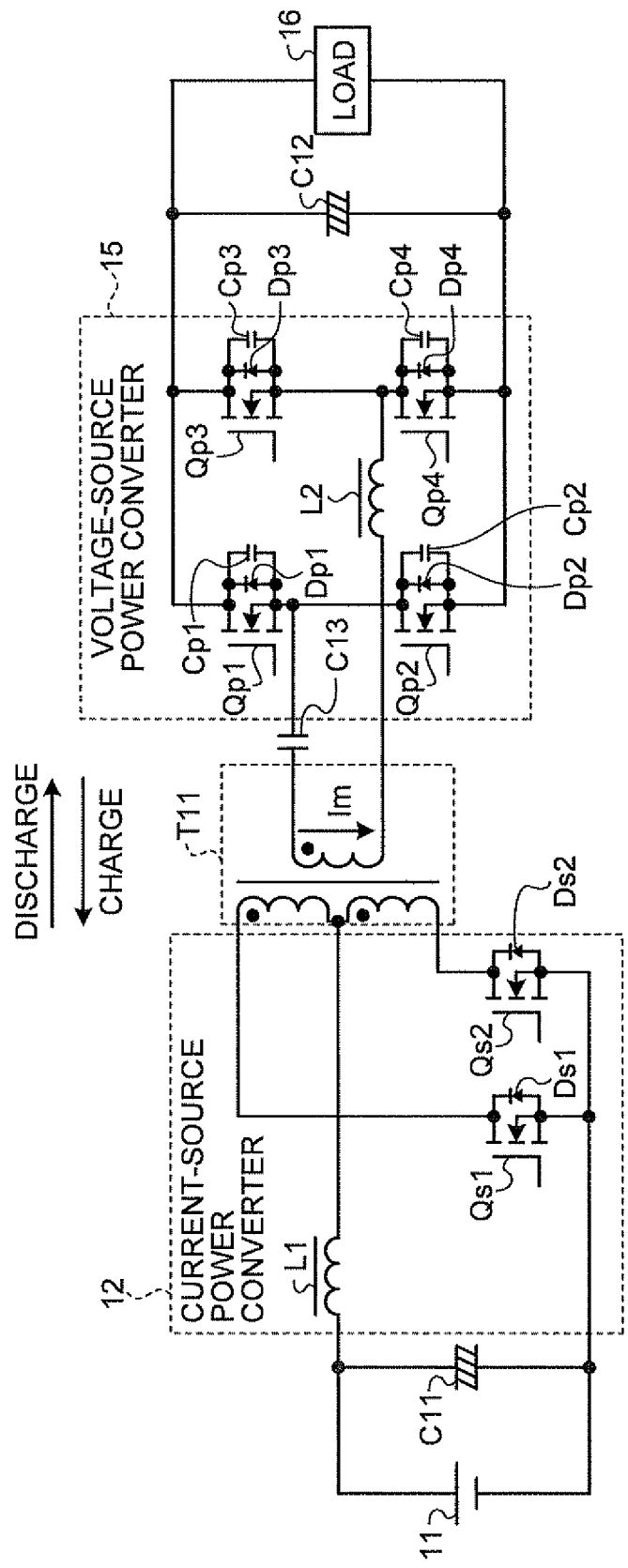
FIG. 3 is a circuit diagram of a DC-DC converter according to a third embodiment of the present invention.

FIG. 3 is a circuit diagram of a DC-DC converter according to a third embodiment of the present invention. In the embodiment illustrated in FIG. 3, the current-source power converter 2 with a push-pull structure is taken as an example.

In FIG. 3, the DC-DC converter includes a transformer T11; a current-source power converter 12 that is connected to the primary side of the transformer T11; and a voltage-source power converter 15 that is connected to the secondary side of the transformer T11.

The current-source power converter 12 controls current that flows into the primary side of the transformer T11 by turning on and off switching elements Qs1 and Qs2, thereby enabling power conversion. The voltage-source power converter 15 controls a voltage to be applied to the secondary side of the transformer T11 by turning on and off switching elements Qp1 to Qp4, thereby enabling power conversion.

In the current-source power converter 12, the switching element Qs1 is connected between one end of primary winding of the transformer T11 and the negative side of a direct-current power supply 11, and the switching element Qs2 is connected between the other end of the primary winding of the transformer T11 and the negative side of the direct-current power supply 11. Free-wheeling diodes Ds1 and Ds2 are connected in parallel with the switching elements Qs1 and Qs2, respectively. An inductor L1 is connected between a center tap of the primary winding of the transformer T11 and the positive side of the direct-current power supply 11. A smoothing capacitor C11 is connected in parallel with the direct-current power supply 11.

The direct-current power supply 11 and the inductor L1 form a current source and current from the current source is controlled by using the switching elements Qs1 and Qs2 so that operation as the current-source power converter 12 is enabled.

In the voltage-source power converter 15, the switching elements Qp1 and Qp2 are connected in series with each other, and the switching elements Qp3 and Qp4 are connected in series with each other. Free-wheeling diodes Dp1 to Dp4 are connected in parallel with the switching elements Qp1 to Qp4, respectively. Capacitors Cp1 to Cp4 are connected in parallel with the switching elements Qp1 to Qp4, respectively.

A series circuit of the switching elements Qp1 and Qp2 and a series circuit of the switching elements Qp3 and Qp4 are connected in parallel with each other. The secondary winding of the transformer T11 is connected between a connecting point of the switching elements Qp1 and Qp2 and a connecting point of the switching elements Qp3 and Qp4 via a capacitor C13 and an inductor L2. The capacitor C13 is connected in series with second winding of the transformer T11.

A load 16 is connected in parallel with the series circuit of the switching elements Qp3 and Qp4. A smoothing capacitor C12 is connected in parallel with the load 16. The load 16 may be, for example, an electronic device that operates with direct current; a storage battery; or a direct-current motor. For further example, the load 16 may be a solar battery cell or an electrical generator. The direct-current power supply 11 may be a storage battery or a storage capacitor. Each of the switching elements Qs1, Qs2, and Qp1 to Qp4 may be a field-effect transistor, a bipolar transistor, or an insulated-gate bipolar transistor (IGBT).

The capacitors Cp1 to Cp4 and the inductor L2 can resonate such that switching is performed at zero voltage, so that soft switching can be achieved.

It is possible to omit the capacitors Cp1 to Cp4 and the inductor L2 by using parasitic capacitance of the switching elements Qp1 to Qp4 and leakage inductance of the transformer T11.

When the direct-current power supply 11 discharges, current that flows into the transformer T11 is controlled by the switching operation of the switching elements Qs1 and Qs2, so that direct current supplied from the direct-current power supply 11 is converted into alternating current, and thereafter, the alternating current is output to the voltage-source power converter 15 through the transformer T11. The alternating current output through the transformer T11 is rectified by the switching operation of the switching elements Qp1 to Qp4, smoothed by the smoothing capacitor C12, and supplied to the load 16.

On the other hand, when the direct-current power supply 11 charges, a voltage to be applied to the transformer T11 is controlled by the switching operation of the switching elements Qp1 to Qp4, so that direct current supplied from the load 16 is converted into alternating current, and thereafter, the alternating current is output to the current-source power converter 12 through the transformer T11. The alternating current output through the transformer T11 is rectified by the switching operation of the switching elements Qs1 and Qs2, smoothed by the smoothing capacitor C11, and supplied to the direct-current power supply 11.

When the direct-current power supply 11 discharges, and if a direct-current component is superimposed on the alternating current to be output to the voltage-source power converter 15, electrical charges corresponding to the direct-current component are accumulated in the capacitor C13, and the direct-current component is cancelled out by a voltage that is generated in the capacitor C13 by accumulation of the electrical charges. Therefore, the direct-current component is blocked from being applied to the transformer T11.

When the direct-current power supply 11 charges, and if a direct-current component is superimposed on the alternating current output from the voltage-source power converter 15, electrical charges corresponding to the direct-current component are accumulated in the capacitor C13, and the direct-current component is cancelled out by a voltage that is generated in the capacitor C13 by accumulation of the electrical charges. Therefore, the direct-current component is blocked from being applied to the transformer T11.

Consequently, even when electrical power of the DC-DC converted is controlled to flow bi-directionally, it is possible to reduce biased magnetization of the transformer T11 by connecting the capacitor C13 in series with the transformer T11 on only the voltage-source power converter 15 side. Therefore, it is not necessary to provide a biased-magnetization prevention circuit on the current-source power converter 12 side. As a result, it is possible to suppress an increase in the number of components.

Figure 4:
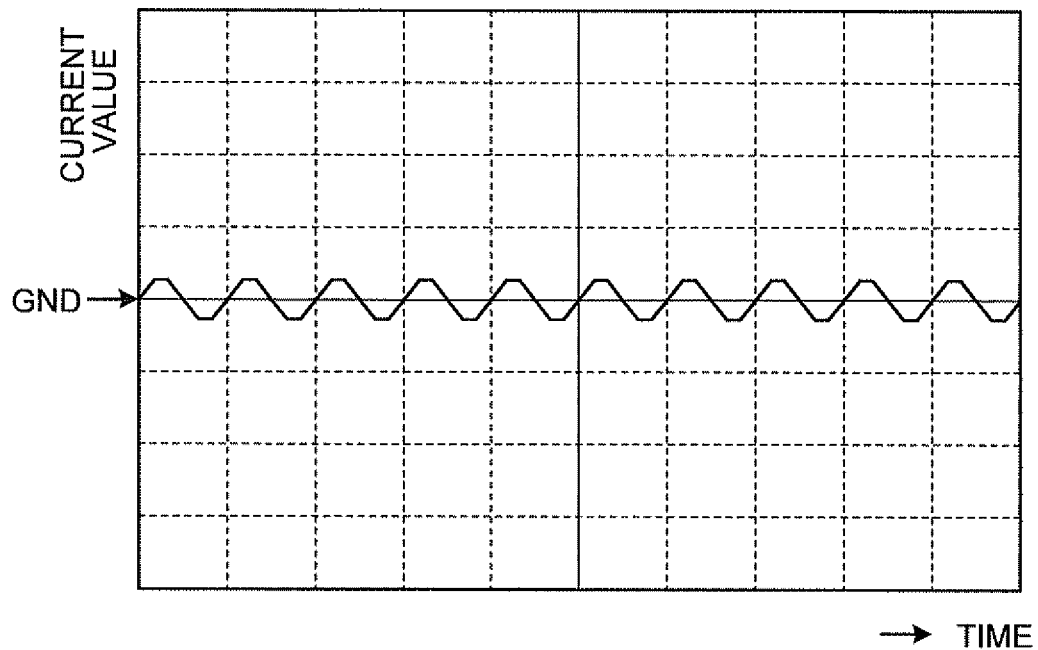
FIG. 4 is a diagram illustrating a simulation result of the waveform of exciting current Im with a capacitor C13 of FIG. 3.

FIG. 4 is a diagram illustrating a simulation result of the waveform of exciting current Im with the capacitor C13 of FIG. 3.

In FIG. 4, when the capacitor C13 of FIG. 3 is provided, a direct-current component of the exciting current Im is removed. Thus, by arranging the capacitor C13, it is possible to reduce biased magnetization of the transformer T11.

Figure 5:
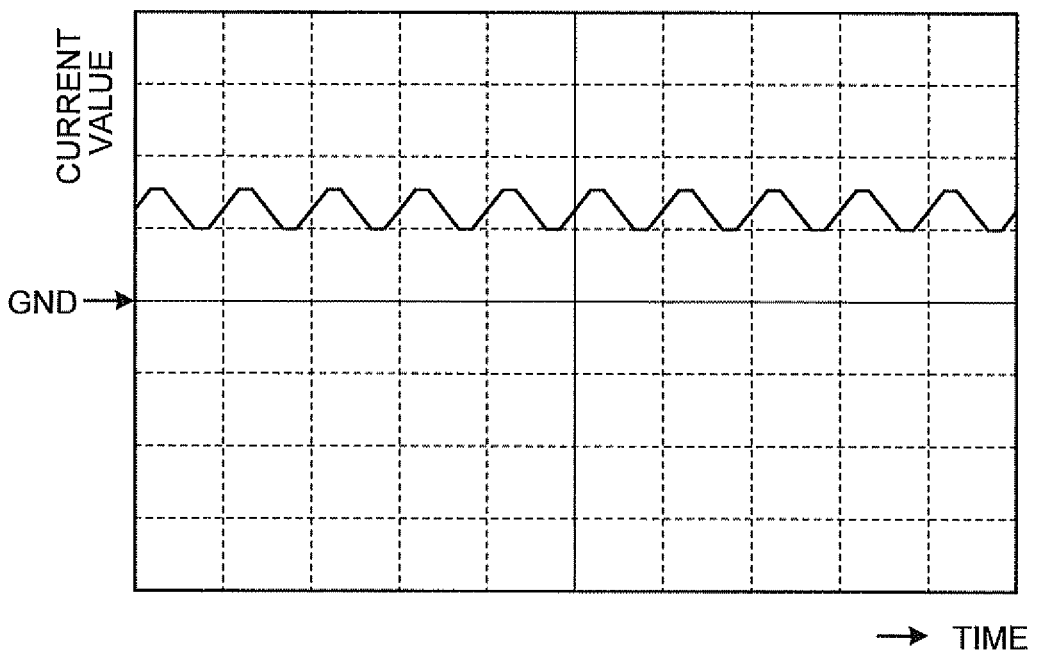
FIG. 5 is a diagram illustrating a simulation result of the waveform of the exciting current Im without the capacitor C13 of FIG. 3.

FIG. 5 is a diagram illustrating a simulation result of the waveform of the exciting current Im without the capacitor C13 of FIG. 3.

In FIG. 5, when the capacitor C13 of FIG. 3 is not provided, a direct-current component is superimposed on the exciting current Im, resulting in causing biased magnetization of the transformer T11.

Figure 6:
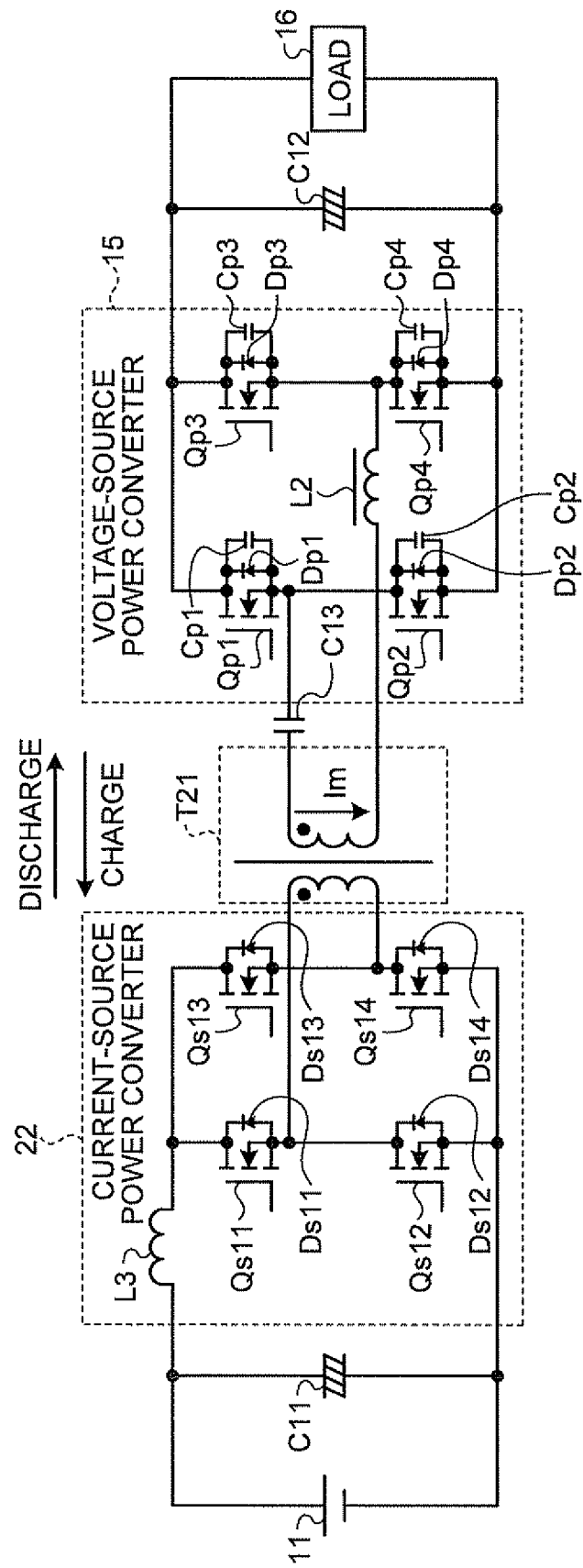
FIG. 6 is a circuit diagram of the DC-DC converter according to the third embodiment of the present invention.

FIG. 6 is a circuit diagram of the DC-DC converter according to the third embodiment of the present invention. In the embodiment illustrated in FIG. 6, a current-source power converter 22 with a push-pull structure is taken as an example.

In FIG. 6, the DC-DC converter includes the current-source power converter 22 and a transformer T21 instead of the current-source power converter 12 and the transformer T11 of FIG. 3. The other configuration of the DC-DC converter is the same as that of FIG. 3.

The current-source power converter 22 includes switching elements Qs11 to Qs14 and an inductor L3. The switching elements Qs11 and Qs12 are connected in series with each other. The switching elements Qs13 and Qs14 are connected in series with each other. A series circuit of the switching elements Qs11 and Qs12 and a series circuit of the switching elements Qs13 and Qs14 are connected in parallel with each other. The primary winding of the transformer T21 is connected between a connecting point of the switching elements Qs11 and Qs12 and a connecting point of the switching elements Qs13 and Qs14. The inductor L3 is connected between a connecting point of the switching elements Qs11 and Qs13 and the positive side of the direct-current power supply 11. Free-wheeling diodes Ds11 to Ds14 are connected in parallel with the switching elements Qs11 to Qs14, respectively.

Each of the switching elements Qs11 to Qs14 may be a field-effect transistor, a bipolar transistor, or an IGBT.

The direct-current power supply 11 and the inductor L3 of FIG. 6 form a current source and current from the current source is controlled by using the switching elements Qs11 and Qs14, so that operation as the current-source power converter 22 becomes possible.

In the DC-DC converter, the gates of the switching elements Qs12 and Qs13 are driven at the same ON/OFF timing as that of the switching element Qs1 of FIG. 3, and the gates of the switching elements Qs11 and Qs14 are driven at the same ON/OFF timing as that of the switching element Qs2 of FIG. 3. Other operation is the same as that of the DC-DC converter of FIG. 3.

The current-source power converter 12 with the push-pull structure as illustrated in FIG. 3 is advantageous when the voltage of the direct-current power supply 11 is low or a voltage fluctuation range of the smoothing capacitor C12 is narrow. The current-source power converter 12 of FIG. 3 can make a circuit structure simpler than that of the current-source power converter 22 with the push-pull structure as illustrated in FIG. 6.

On the other hand, when the voltage of the direct-current power supply 11 is high or the voltage fluctuation range of the smoothing capacitor C12 is wide, because voltage stress on the switching elements Qs1 and Qs2 increases, the current-source power converter with the push-pull structure as illustrated in FIG. 6 is desirable.

According to one aspect of the present invention, it is possible to reduce biased magnetization of a transformer without having to detect current that flows through the transformer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A bidirectional DC-DC converter comprising:

a transformer having a primary winding and a secondary winding;

a current-source power converter that is connected with the primary winding;

a capacitor that is connected in series with the secondary winding; and a voltage-source power converter that is connected with the secondary winding via the capacitor, wherein the current-source power converter includes:
- a first switching element that is connected between one end of the primary winding and a negative side of the direct-current power supply; and
- a second switching element that is connected between another end of the primary winding and the negative side of the direct-current power supply,
- the first switching element and the second switching element being connected in parallel with each other, the current-source power converter further includes an inductor which forms a current source with the direct-current power supply, the current source supplying direct current, the inductor being arranged between a positive side of the direct-current power supply and a center tap of the primary winding of the transformer, the voltage-source power converter includes:
- a first series circuit in which a third switching element and a fourth switching element are connected in series with each other; and
- a second series circuit in which a fifth switching element and a sixth switching element are connected in series with each other,
- the first series circuit and the second series circuit being connected in parallel with each other, the secondary winding of the transformer is provided between a connecting point of the third switching element and the fourth switching element and a connecting point of the fifth switching element and the sixth switching element, wherein when the direct-current power supply discharges, current that flows into the transformer is controlled by a switching operation of the first and second switching elements, so that direct current supplied from the current source is converted into alternating current, and the alternating current is output to the voltage-source power converter through the transformer, the alternating current output through the transformer is rectified by a switching operation of the third to sixth switching elements and supplied to a load, the load being connected in parallel with the first series circuit and the second series circuit, when the direct-current power supply charges, a voltage to be applied to the transformer is controlled by a switching operation of the third to sixth switching elements, so that direct current supplied from the load is converted into alternating current, and the alternating current is output to the current-source power converter through the transformer, the alternating current output through the transformer is rectified by a switching operation of the first and second switching elements and supplied to the direct-current power supply, the direct-current power supply being connected in parallel with the first switching element and the second switching element, wherein the capacitor reduces biased magnetization of the transformer, when the direct-current power supply discharges and when the direct-current power supply charges.

2. A bidirectional DC-DC converter comprising:

a transformer having a primary winding and a secondary winding;

a current-source power converter that is connected with the primary winding;

a capacitor that is connected in series with the secondary winding; and a voltage-source power converter that is connected with the secondary winding via the capacitor, wherein the current-source power converter includes,
- a first series circuit in which a first switching element and a second switching element are connected in series with each other; and
- a second series circuit in which a third switching element and a fourth switching element are connected in series with each other,
- the first series circuit and the second series circuit being connected in parallel with each other, the primary winding of the transformer is provided between a connecting point of the first switching element and the second switching element and a connecting point of the third switching element and the fourth switching element, and the current-source power converter further includes an inductor which forms a current source with a direct-current power supply, the current source supplying direct current, the inductor being arranged between a connecting point of the first switching element and the third switching element and a positive side of the direct-current power supply, the voltage-source power converter includes:
- a third series circuit in which a fifth switching element and a sixth switching element are connected in series with each other, and
- a fourth series circuit in which a seventh switching element and a eighth switching element are connected in series with each other,
- the third series circuit and the fourth series circuit being connected in parallel with each other, the secondary winding of the transformer is provided between a connecting point of the fifth switching element and the sixth switching element and a connecting point of the seventh switching element and the eighth switching element, wherein when the direct-current power supply discharges, current that flows into the transformer is controlled by a switching operation of the first to fourth switching elements, so that direct current supplied from the current source is converted into alternating current, and the alternating current is output to the voltage-source power converter through the transformer, the alternating current output through the transformer is rectified by a switching operation of the fifth to eighth switching elements and supplied to a load, the load being connected in parallel with the third series circuit and the fourth series circuit, when the direct-current power supply charges, a voltage to be applied to the transformer is controlled by a switching operation of the fifth to eight switching elements, so that direct current supplied from the load is converted into alternating current, and the alternating current is output to the current-source power converter through the transformer, the alternating current output through the transformer is rectified by a switching operation of the first to fourth switching elements and supplied to the direct-current power supply, the direct-current power supply being connected in parallel with the first series circuit and the second series circuit, wherein the capacitor reduces biased magnetization of the transformer, when the direct-current power supply discharges and when the direct-current power supply charges.

3. The bidirectional DC-DC converter according to claim 1, wherein
   another inductor is connected in series with the secondary wiring of the transformer to which the capacitor is connected in series, so that switching is performed at zero voltage.

4. The bidirectional DC-DC converter according to claim 1, wherein
   each of the first to sixth switching elements includes a field-effect transistor and a diode, so that each switching operation of the first and second switching elements and each switching operation of third to sixth switching elements can be controlled by driving a gate of the field-effect transistor of each switching element.

5. The bidirectional DC-DC converter according to claim 2, wherein
   another inductor is connected in series with the secondary wiring of the transformer to which the capacitor is connected in series, so that switching is performed at zero voltage.

6. The bidirectional DC-DC converter according to claim 2, wherein
   each of the first to eighth switching elements includes a field-effect transistor and a diode, so that each switching operation of the first to fourth switching elements and each switching operation of fifth to eighth switching elements can be controlled by driving a gate of the field-effect transistor of each switching element.

* * * * *